(12) United States Patent
Carnevali

(10) Patent No.: US 8,590,855 B2
(45) Date of Patent: Nov. 26, 2013

(54) HANDLEBAR MOUNTING DEVICE

(76) Inventor: Jeffrey D. Carnevali, Seattle, WA (US)

(*) Notice: Subject to any disclaimer, the term of this patent is extended or adjusted under 35 U.S.C. 154(b) by 277 days.

(21) Appl. No.: 12/462,699

(22) Filed: Aug. 6, 2009

(65) Prior Publication Data
US 2011/0031370 A1    Feb. 10, 2011

(51) Int. Cl.
*A47G 1/24* (2006.01)
(52) U.S. Cl.
USPC .......................... 248/479; 403/120; 403/227
(58) Field of Classification Search
USPC ......... 248/479, 292.13; 403/65, 79, 120, 150, 403/224, 227
See application file for complete search history.

(56) References Cited

U.S. PATENT DOCUMENTS

| | | | | | |
|---|---|---|---|---|---|
| 540,764 | A | * | 6/1895 | Spring | 403/150 |
| 1,396,324 | A | * | 11/1921 | Gieseke | 280/93.512 |
| 2,240,709 | A | * | 5/1941 | Mead | 403/162 |
| 2,358,518 | A | * | 9/1944 | Kraft | 403/168 |
| 2,366,860 | A | * | 1/1945 | Kraft | 403/224 |
| 2,416,243 | A | * | 2/1947 | Thiry | 403/224 |
| 2,749,160 | A | * | 6/1956 | Cowles | 403/227 |
| 2,819,105 | A | * | 1/1958 | Behnke | 403/224 |
| 2,937,040 | A | * | 5/1960 | Hutton | 403/227 |
| 3,637,269 | A | * | 1/1972 | Lantry | 384/281 |
| 3,887,156 | A | * | 6/1975 | Hugonnier | 248/549 |
| 3,940,553 | A | * | 2/1976 | Hawkins | 174/42 |
| 4,165,156 | A | * | 8/1979 | O'Connell | 359/841 |
| 5,073,019 | A | * | 12/1991 | Ferreira do Espirito Santo | 359/872 |
| 5,120,015 | A | * | 6/1992 | do Espirito Santo | 248/479 |
| 5,320,443 | A | * | 6/1994 | Lien et al. | 403/154 |
| 7,261,272 | B2 | * | 8/2007 | Courbon | 248/475.1 |
| 7,452,088 | B2 | * | 11/2008 | Brester et al. | 359/841 |
| 7,594,731 | B2 | * | 9/2009 | Sinelli et al. | 359/841 |
| 2005/0237643 | A1 | * | 10/2005 | Wu | 359/871 |
| 2006/0000957 | A1 | * | 1/2006 | Carnevali | 248/181.1 |
| 2008/0265122 | A1 | * | 10/2008 | Branham | 248/479 |
| 2009/0189041 | A1 | * | 7/2009 | Weber et al. | 248/292.13 |

* cited by examiner

*Primary Examiner* — Bradley Duckworth
(74) *Attorney, Agent, or Firm* — Charles J. Rupnick Attorney at Law

(57) ABSTRACT

A novel handlebar mounting device structured to mount to a mirror mount receiver on a handlebar where a mirror mounting stem supporting a mirror normally resides. The novel handlebar mounting device includes a pivot arm having a pivot base and a coupler interface with therebetween a pivot joint having an adjustable rotational stiffness. The pivot joint is formed of an arm and a hub relatively rotatably suspended therefrom, an elastomeric interface between the arm and the hub, and a means for compressing the elastomeric interface between the arm and the hub. A coupler component is formed on the coupler interface. A connector is adapted for securing the pivot base to a mirror mount receiver on a handlebar where a mirror mounting stem supporting a mirror normally resides.

20 Claims, 14 Drawing Sheets

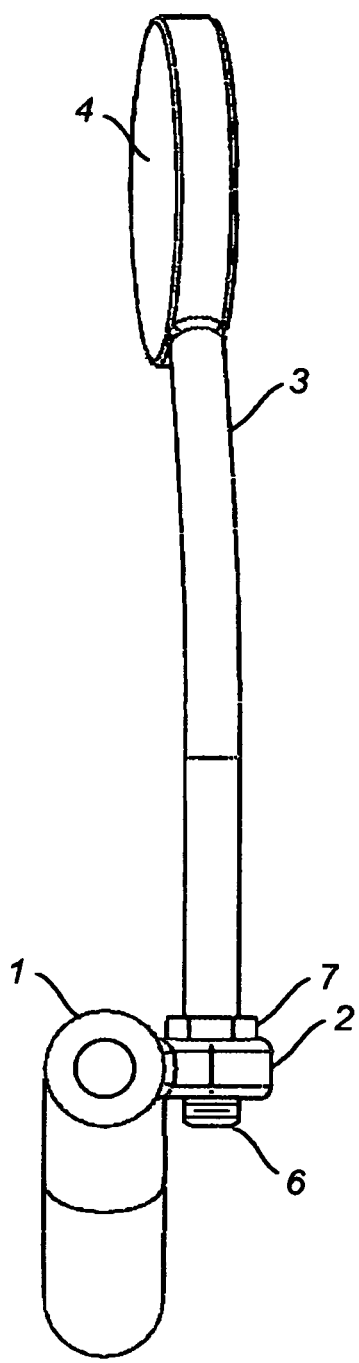
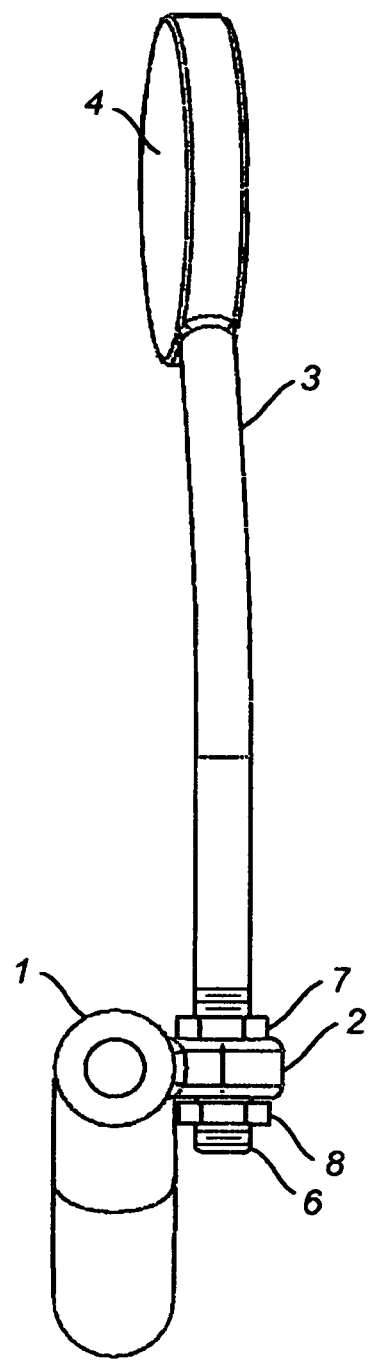
Fig. 2
(Prior Art)
Fig. 3
(Prior Art)

US 8,590,855 B2

HANDLEBAR MOUNTING DEVICE

FIELD OF THE INVENTION

The present invention relates generally to means for providing a handlebar mounting device on a motorcycle handlebar, and in particular to a means for providing a ball component of a ball-and-socket device in pre-existing mounting space on the handlebar.

BACKGROUND OF THE INVENTION

Many after-market accessories are available for mounting on the handlebars of motorcycles. However, motorcycle manufacturers leave little or no real estate on the handlebars for the mounting of after-market accessories. Therefore, innovative ways of maximizing utilization of the available real estate are required.

SUMMARY OF THE INVENTION

The present invention is a novel handlebar mounting device is provided for mounting to a mirror mount receiver on a handlebar where a mirror mounting stem supporting a mirror normally resides, and providing a ball component of a ball-and-socket device.

According to one aspect of the invention, the novel handlebar mounting device includes a pivot arm having a pivot base and a coupler interface with therebetween a pivot joint with an adjustable rotational stiffness. The pivot joint is formed of an arm with a hub relatively rotatably suspended therefrom, an elastomeric interface between the arm and the hub, and a means for compressing the elastomeric interface between the arm and the hub. A coupler component is formed on the coupler interface. A connector is secures the pivot base to a mirror mount receiver on a handlebar where a mirror mounting stem supporting a mirror normally resides.

A method is also disclosed for adjusting the rotational stiffness of the pivot joint.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 illustrates a wrench interface on the mirror for securing to the handlebar;

FIG. 3 illustrates a nut for securing the mirror to the handlebar;

DETAILED DESCRIPTION OF PREFERRED EMBODIMENT

In the Figures, like numerals indicate like elements.

Figure 1:
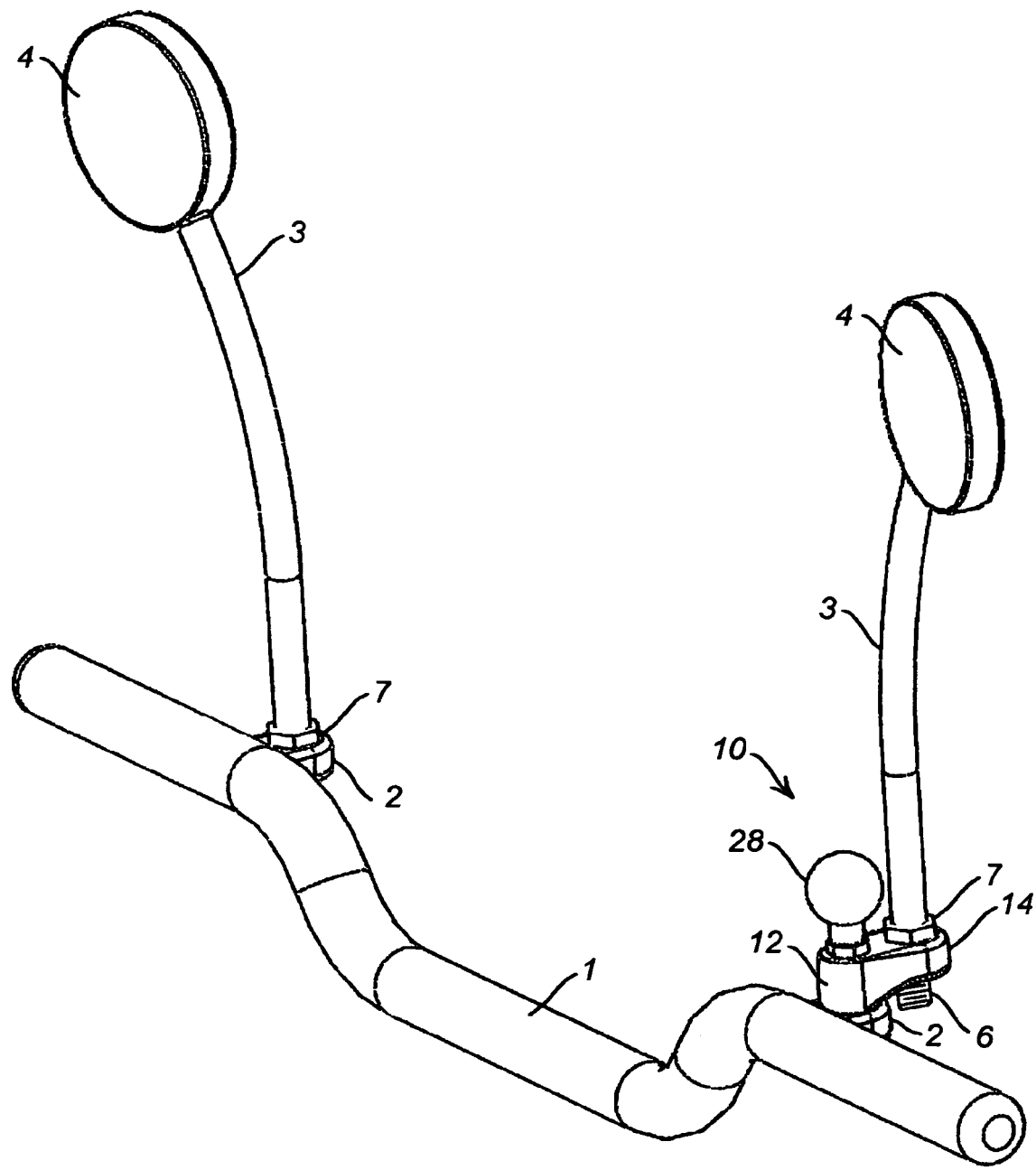
FIG. 1 illustrates a pair of rear view mirrors mounted on a handlebar.
Figure 4:
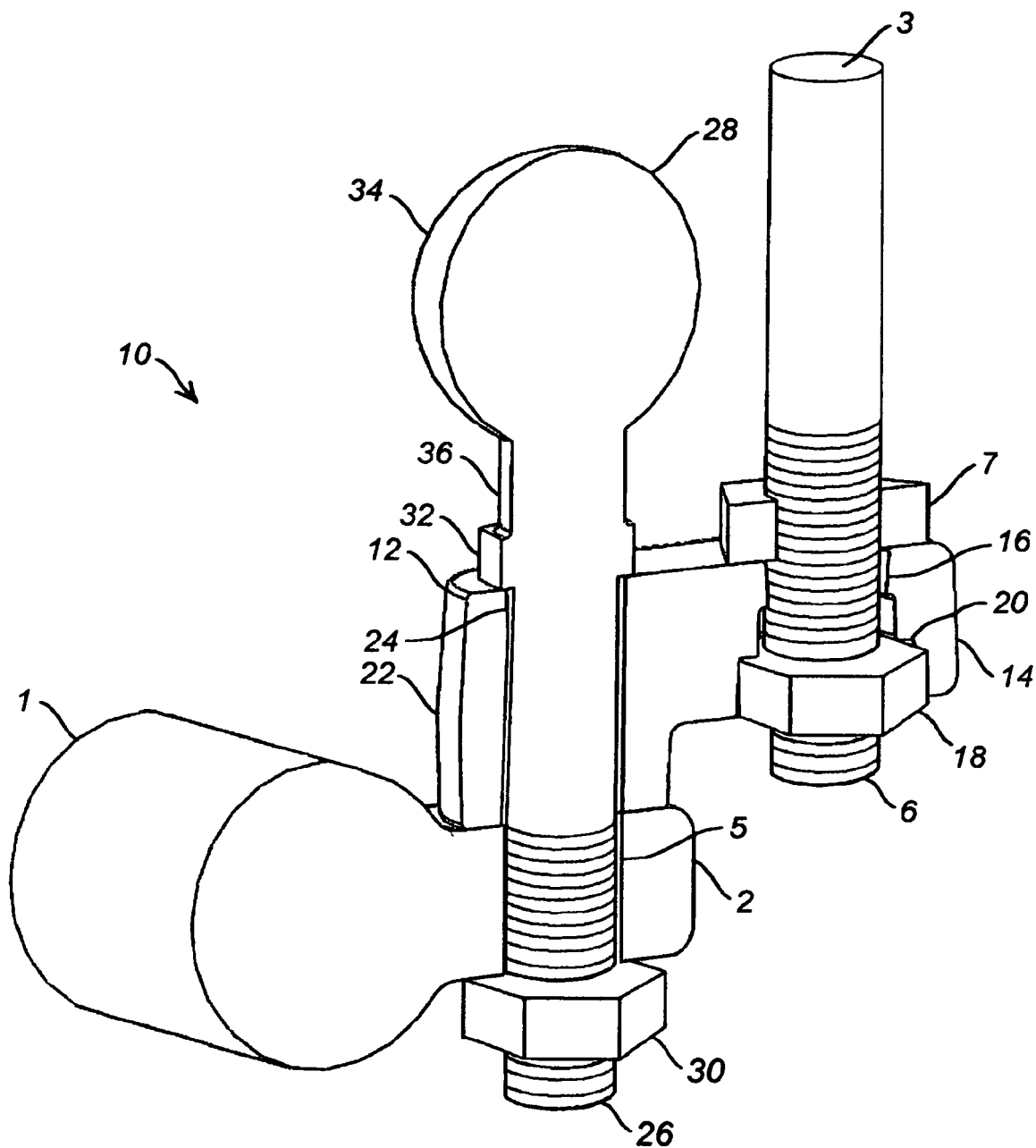
FIG. 4 illustrates a novel mirror adapter mount coupled between the mirror and handlebar.

FIG. 1 illustrates a handlebar 1 having a pair of mirror mount receivers 2 each formed as an eye sized to receive therethrough a mirror mounting stem 3 supporting a rear view mirror 4. As illustrated in FIG. 4, mirror mount receiver eye 2 is formed with an aperture 5 sized to receive mounting stem 3 supporting mirror 4. For example, aperture 5 is threaded to mate with a thread 6 formed on mounting stem 3 supporting mirror 4. As more clearly shown in FIG. 2, mirror mounting stem 3 may include a wrench interface 7, such as a hex, for tightening mounting stem 3 with mirror mount receiver eye 2. Alternatively, as illustrated in FIG. 3, instead of a matching thread, aperture 5 of mirror mount receiver eye 2 is a clearance hole for thread 6 of mirror mounting stem 3, and a nut 8 engages thread 6 on mounting stem 3 opposite from wrench interface 7. Also, wrench interface 7 may be replaced by a nut 9 that engages thread 6 above mirror mount receiver eye 2 for securing mounting stem 3 with mirror 4.

A novel mirror adapter mount 10 is installed on handlebar 1 at one of the pair of mirror receivers 2. Novel mirror adapter mount 10 is mounted between mirror mount receiver eye 2 and mirror 4. Mirror adapter mount 10 is a rigid bracket 12 adapted to mate with mirror mount receiver eye 2 with a mirror mount receiver eye 14 adapted to receive and secure mounting stem 3 of mirror 4. For example, in FIG. 1 receiver eye 14 of mirror adapter mount 10 is threaded to mate with thread 6 formed on mounting stem 3 supporting mirror 4.

FIG. 4 illustrates aperture 5 of mirror mount receiver eye 2 as a smooth bore clearance hole for thread 6 of mirror mounting stem 3. Receiver eye 14 of bracket 12 includes an aperture 16 for thread 6 of mirror mounting stem 3 of mirror 4. For example, aperture 16 is a smooth bore clearance hole similar to aperture 5 of mirror mount receiver eye 2, and a lock nut 18 engages thread 6 for securing mirror mounting stem 3. Optionally, receiver eye 14 includes a nut pocket 20 sized to receive nut 18 and resist turning when thread 6 of mirror mounting stem 3 is turned.

Receiver eye 14 is cantilevered from a hub 22 of bracket 12 that is adapted to mate with mirror mount receiver eye 2 of handlebar 1. For example, hub 22 is centered on a clearance hole 24 sized to receive therethrough a stem 26 of a connector 28. When mirror mount receiver eye 2 has a threaded hole 5 for thread 6 of mirror mounting stem 3, stem 26 of connector 28 is a threaded shaft matched to threaded hole 5. Else, when mirror mount receiver eye 2 has a clearance hole 5 for thread 6 of mirror mounting stem 3, stem 26 of connector 28 is a threaded shaft sized to slip through clearance hole 5. A lock nut 30 engages threaded stem 26 for securing connector 28.

According to one embodiment, connector 28 has a wrench interface 32, such as a hex or socket, for tightening mirror mounting stem 3 with mirror mount receiver eye 2. Connector 28 includes a part-spherical coupler component 34 that is radially resiliently compressible because it is molded of a resiliently deformable neoprene rubber. Part-spherical coupler component 34 is spaced away from hub 22 of bracket 12 on a slender neck portion 36 of stem 26 for use as the ball component of a rotationally and spherically adjustable ball-and-socket device, such as but not limited to the universally positionable mounting device disclosed by the inventor of the present invention in U.S. Pat. No. 5,845,885, which is incorporated herein by reference.

Figure 5:
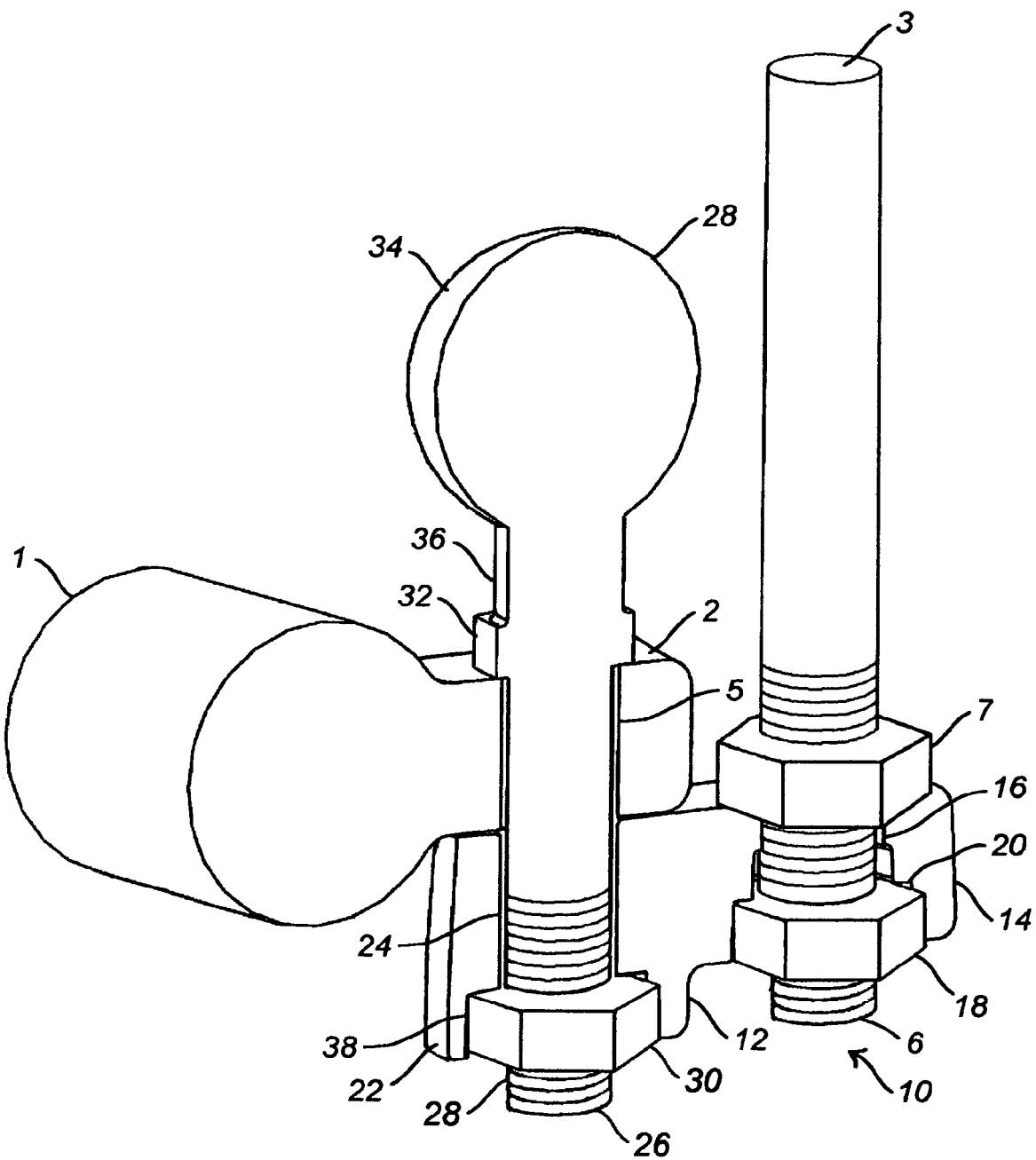
FIG. 5 illustrates one alternative embodiment of a bracket portion of the novel mirror adapter mount.

FIG. 5 illustrates one alternative embodiment of bracket 12 wherein hub 22 is formed with an optional nut pocket 38 sized to receive thereinto nut 30 and resist its turning when threaded stem 26 of connector 28 is turned in clearance aperture 5 for mounting mirror adapter mount 10 to mirror mount receiver eye 2.

Figure 6:
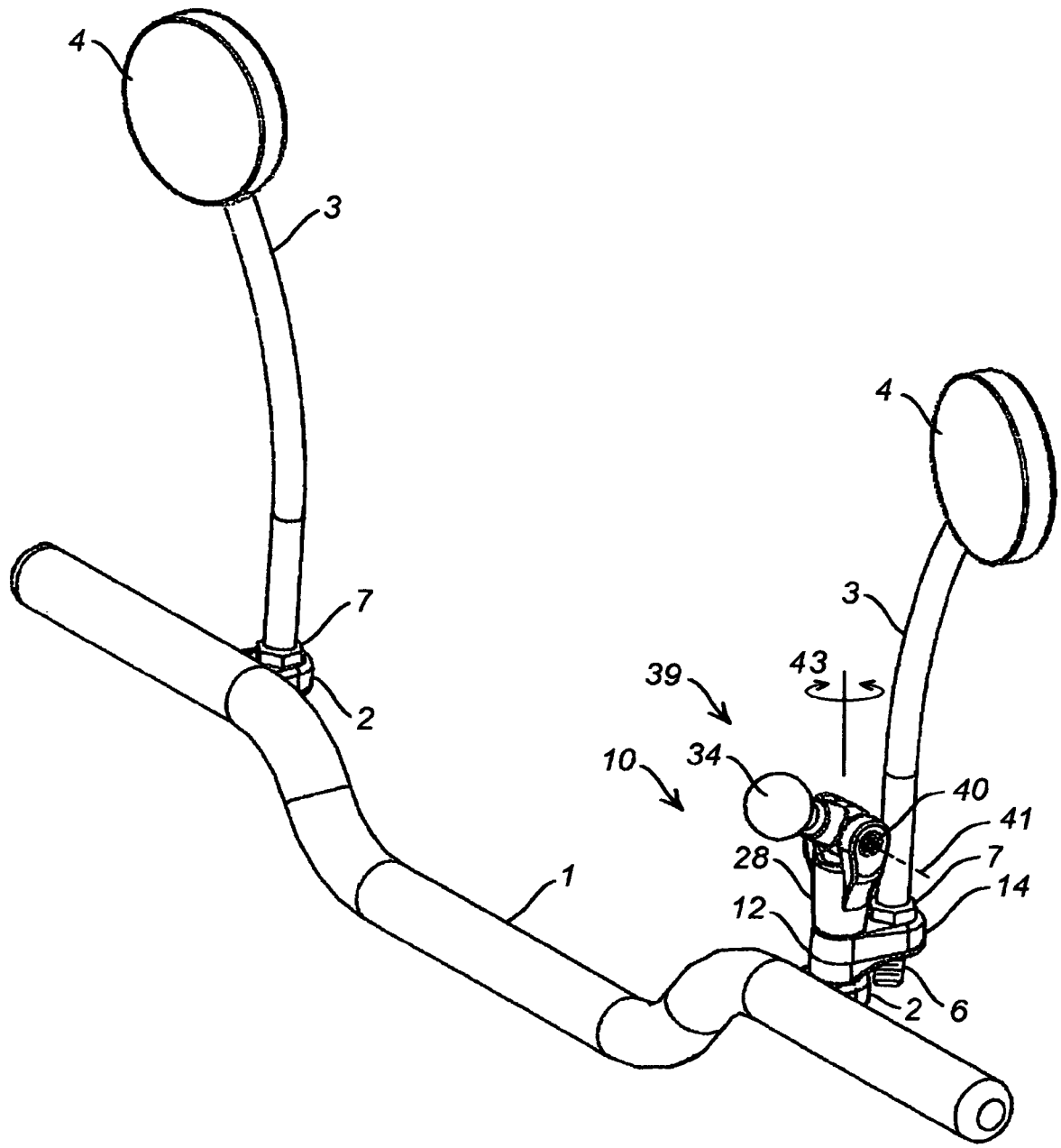
FIG. 6 illustrates a pivot joint between the bracket and a ball component of the novel mirror adapter mount.

FIG. 6 illustrates connector 28 of mounting mirror adapter mount 10 further connecting a rotatable handlebar mounting device 39 to mirror mount receiver eye 2 in addition to bracket 12. Mounting device 39 provides a pivot joint 40 between coupler component 34 and bracket 12. Pivot joint 40 permits coupler component 34 to be pivotally rotated about a pivot axis 41 into different positions relative to mounting stem 3 with rear view mirror 4. Both mounting device 39 and bracket 12 are further rotatable (arrow 43) about connector 28 before securing to receiver eye 2 such that mounting device 39 and mounting stem 3 supporting rear view mirror 4 may be adjusted relative to handlebar 1, either independently or together, before tightening connector 28.

Figure 7:
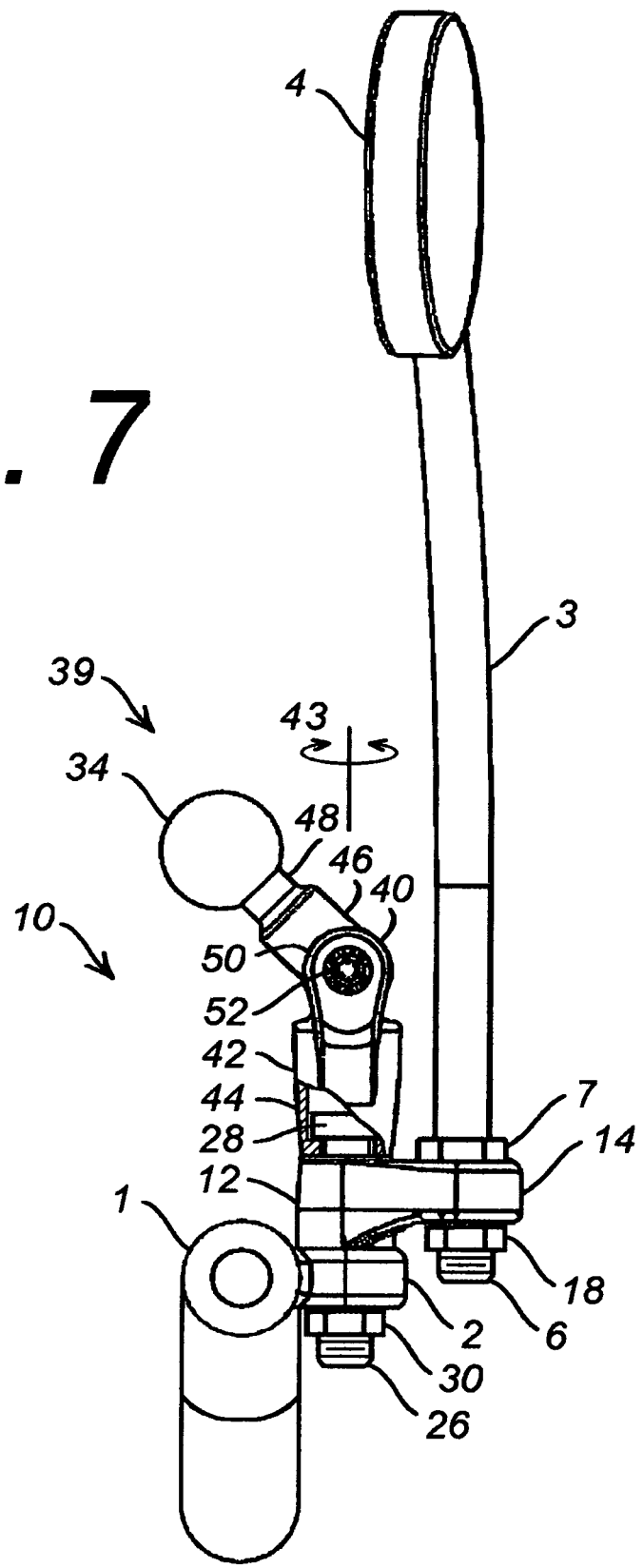
FIG. 7 illustrates the pivot joint between the bracket and a ball component of the novel mirror adapter mount.

FIG. 7 also illustrates connector 28 of mounting mirror adapter mount 10 connecting handlebar mounting device 39 to mirror mount receiver eye 2 along with addition to bracket 12. Rotatable mounting device 39 is shown having pivot joint 40 between coupler component 34 and bracket 12. For example, pivot joint 40 is embodied in a pivot arm 42 between coupler component 34 and bracket 12. According to one embodiment, pivot arm 42 includes a pivot base 44 that is coupleable to bracket 12, and a coupler interface 46 with pivot joint 40 in between. Coupler interface 46 includes coupler component 34 formed on a slender neck member 48 opposite from pivot joint 40. Pivot joint 40 is formed of a yoke 50 with a pivot pin 52 through coupler interface 46 opposite from coupler component 34.

Pivot arm 42 is optionally connected to mirror mount receiver eye 2 by connector 28 inserted through pivot base 44. However, here connector 28 is shown optionally inserted through pivot base 44 for connecting both mounting device 39 and bracket 12 to receiver eye 2.

Figure 8:
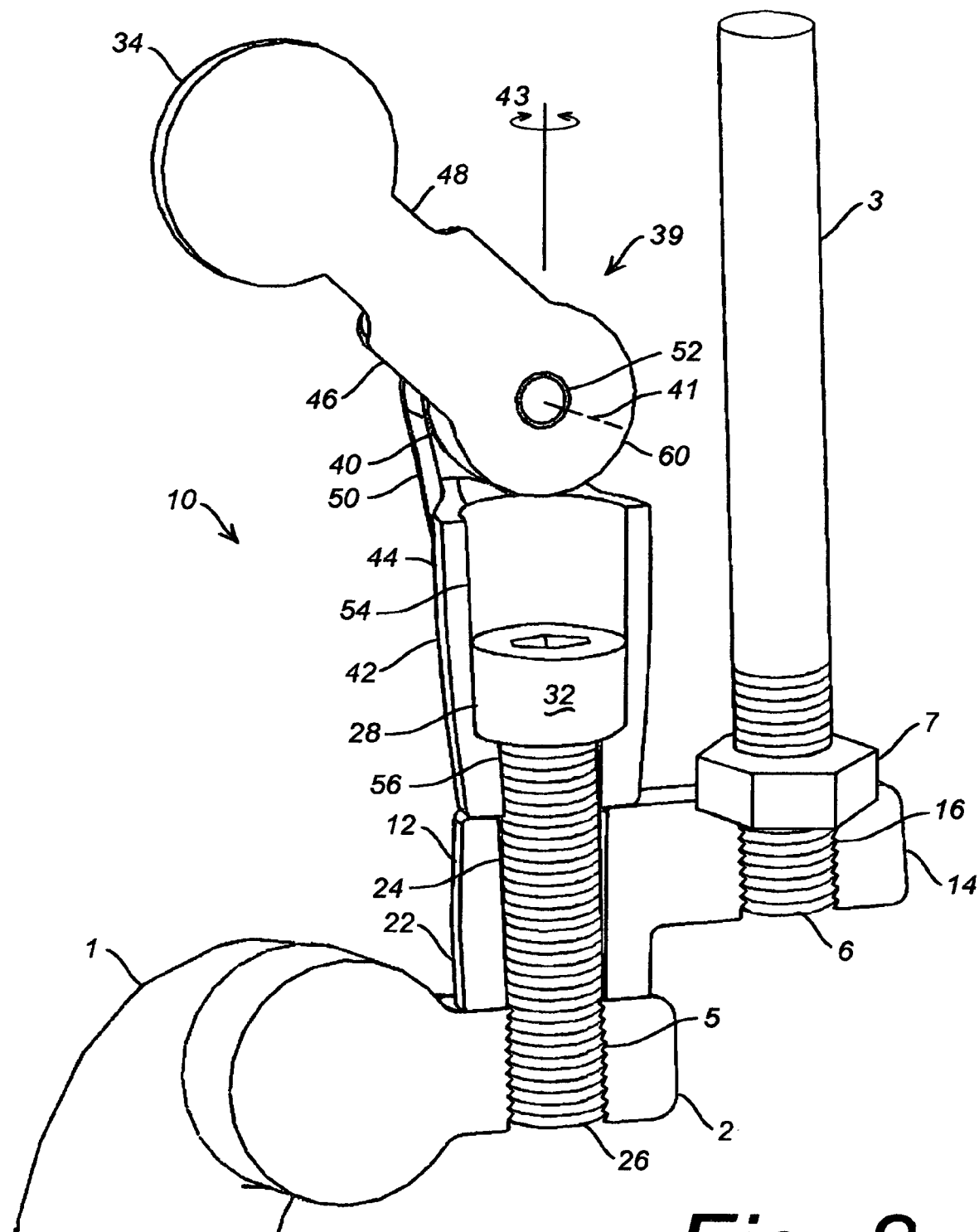
FIG. 8 is a cross-section of the novel mirror adapter mount having the pivot joint.

FIG. 8 illustrates an option of connector 28 being inserted through pivot base 44 for connecting both bracket 12 and pivot arm 42 of mounting device 39 to mirror mount receiver eye 2. For example, pivot base 44 is formed with a counterbore 54 beneath yoke 50, and a clearance hole 56 for connector 28. Here, aperture 5 of mirror mount receiver eye 2 is threaded to receive thread 6 formed on mounting stem 3 with mirror 4. Accordingly, connector 28 is a machine screw having stem 26 threaded similarly to thread 6 so as to match threaded aperture 5. Threaded stem 26 of connector 28 passes through both clearance holes 56 and 24 and threadedly engages threaded aperture 5 to couple both pivot base 44 of pivot arm 42 and bracket 12 to mirror mount receiver eye 2 of handlebar 1. Either or both mounting device 39 and bracket 12 may be rotatably adjusted (arrow 43) about connector 28, either independently or together, before securing to receiver eye 2 by tightening connector 28.

Receiver eye 14 of bracket 12 includes an aperture 16 for thread 6 of mirror mounting stem 3 of mirror 4. Accordingly, aperture 16 of receiver eye 14 is a threaded hole similar to threaded aperture 5 of mirror mount receiver eye 2, and thread 6 engages threaded aperture 16 of receiver eye 14 for securing mirror mounting stem 3 to receiver eye 14.

Figure 9:
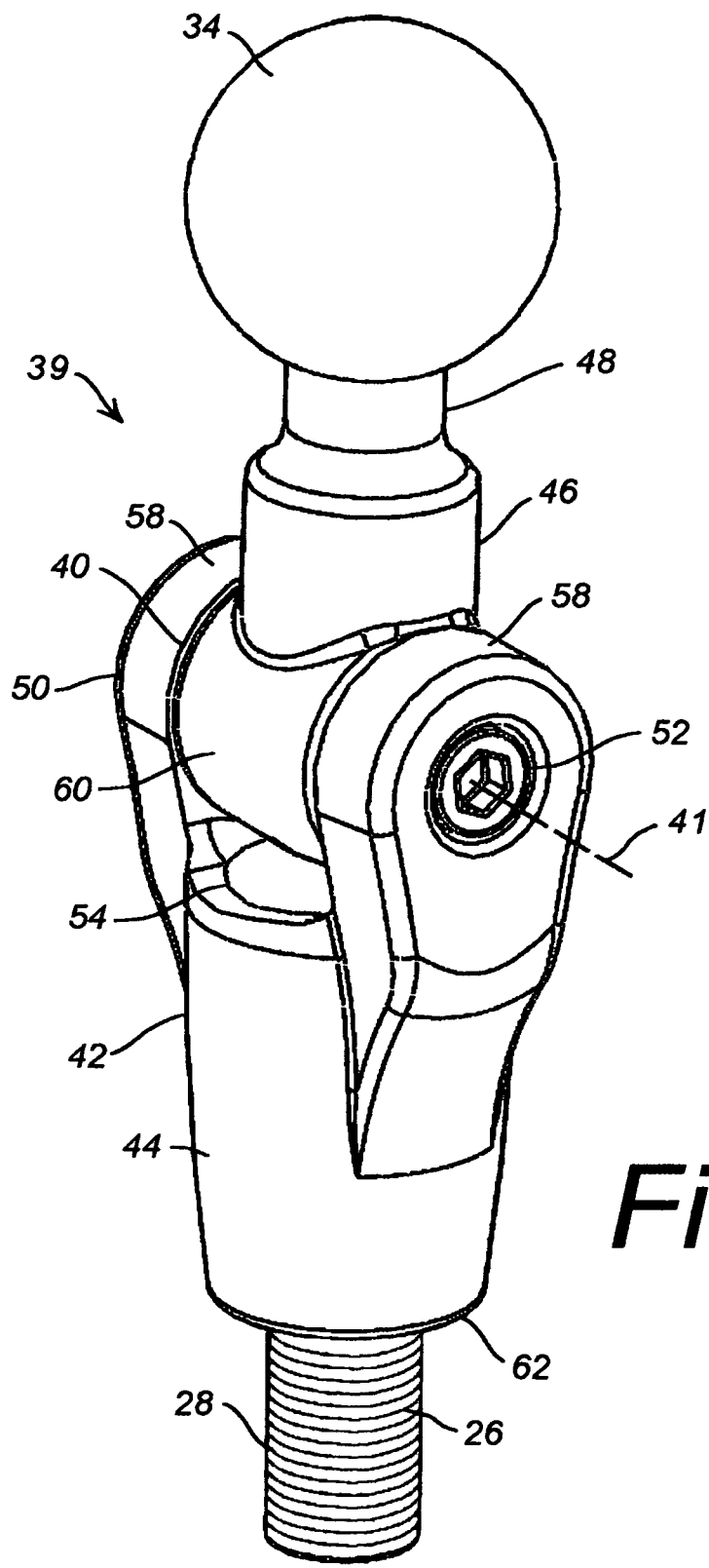
FIG. 9 illustrates the novel mounting mirror adapter mount having the pivot joint.

FIG. 9 illustrates handlebar mounting device 39 having pivot arm 42. Yoke 50 of pivot joint 40 is formed as a pair of support arms 58 extended above pivot base 44. Coupler interface 46 includes a barrel hub 60 with coupler component 34 extended on neck member 48. Barrel hub 60 of coupler interface 46 is rotatable between support arms 58 of yoke 50. Pivot pin 52 passes through both support arms 58 of yoke 50 with barrel hub 60 in between.

Base 44 of pivot arm 42 is formed with a shoulder 62 for engaging and nesting against hub 22 of bracket 12 when connector 28 is installed into mirror mount receiver eye 2.

Figure 10:
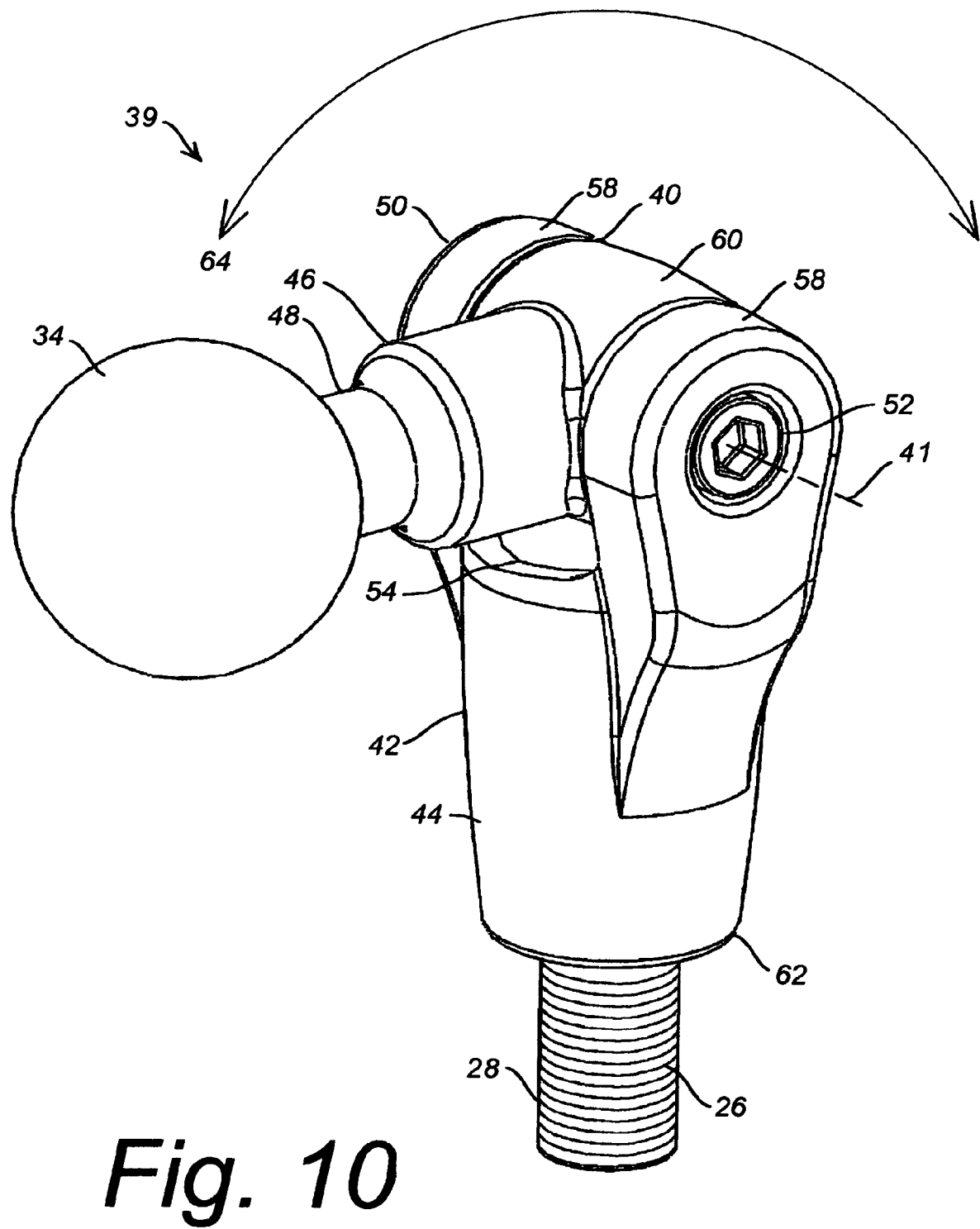
FIG. 10 illustrates a radial range of motion of the novel mounting mirror adapter mount through rotation of the pivot joint.

FIG. 10 illustrates a radial range of motion (arrow 64) of coupler component 34 of mounting mirror adapter mount 10 through rotation of pivot joint 40 about pivot axis 41 between coupler interface 46 and pivot base 44.

Figure 11:
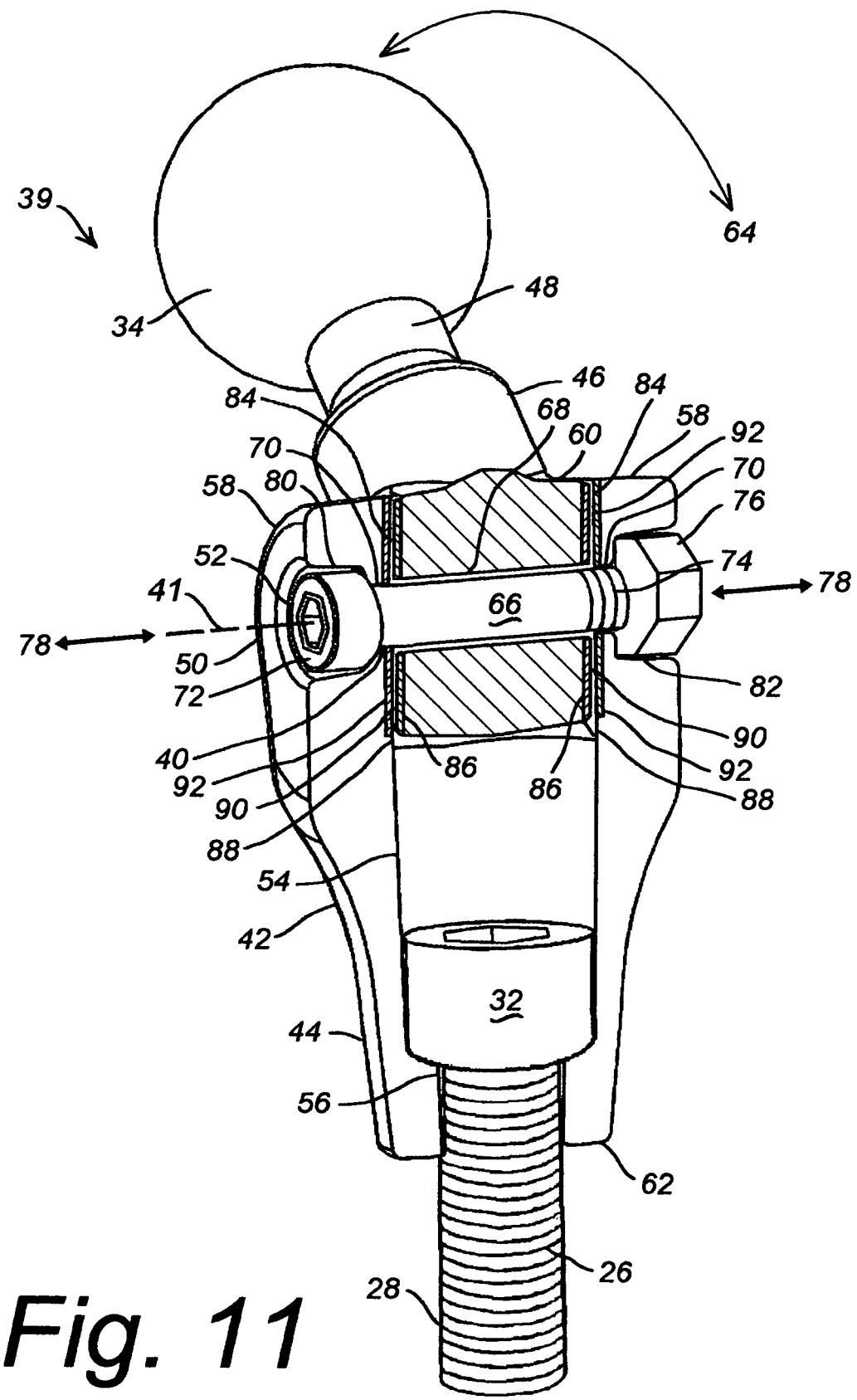
FIG. 11 illustrates one embodiment of an elastomeric interface of the pivot joint.

FIG. 11 is a cross-section of pivot arm 42. According to one embodiment, pivot joint 40 is adjustable by means of pivot pin 52 operating between arms 58 of yoke 50. For example, pivot pin 52 includes a cylindrical shaft 66 passing through a central bore 68 through barrel hub 60 of coupler interface 46 and apertures 70 in each arm 58 of yoke 50. Pivot pin 52 has a head 72 at one end of shaft 66 and threads 74 at the other end. A lock nut 76 is coupled to threads 70 of pivot pin 52. Alternate tightening and loosening of pivot pin 52 along pivot axis 41 tightens and loosens (arrows 78) pivot joint 40. Optionally, arms 58 of yoke 50 are slightly flexible such that tightening of pivot pin 52 flexes yoke 50 and compresses arms 58 inwardly about barrel hub 60 of coupler interface 46. Compression of yoke 50 about barrel hub 60 stiffens pivot joint 40 against rotation about pivot axis 41. Loosening of pivot pin 52 relaxes yoke 50 and decompresses arms 58 outwardly from barrel hub 60, which relaxes pivot joint 40 and permits coupler interface 46 to rotate about pivot axis 41. Adjustment of pivot joint 40 is accomplished by loosening pivot pin 52, rotating coupler component 34 is to a desired angular arrangement within radial range of motion (arrow 64), and re-tightening pivot pin 52 to secure the desired angular arrangement. Accordingly, a means for compressing the elastomeric interface 84 between the arm 42 and the hub 60 is a means for shortening the pivot pin 52 between the arm 42 and the hub 60. According to one embodiment, head 72 of pivot pin 52 is recessed in a counter bore 80 in one arm 58 of yoke 50, and nut 76 is seated in a nut pocket 82 in opposite arm 58.

According to one embodiment of handlebar mounting device 39, pivot joint 40 includes a resiliently compressible elastomeric interface 84 between cooperating interface surfaces 86 and 88 of barrel hub 60 of coupler interface 46 and support arms 58 of yoke 50 of pivot arm 42. Elastomeric interface 84 is provided for maintaining stiffness of pivot joint 40 for permitting rotation (arrow 64) about pivot axis 41 to a new angular orientation without loosening and subsequent tightening pivot pin 52 to achieve and secure the desired angular arrangement. Such alternate loosening and subsequent tightening of pivot pin 52 was necessary in prior art devices for changing angular orientation. Here, elastomeric interface 84 permits rotation of pivot joint 40 about pivot axis 41, while simultaneously stiffening pivot joint 40 for maintaining a desired angular arrangement of coupler component 34. For example, elastomeric interface 84 is provided between barrel hub 60 of coupler interface 46 and one or both support arms 58 of yoke 50. Rotational stiffness of pivot joint 40 for controlling angular arrangement of coupler component 34 is adjustable by adjusting compression of elastomeric interface 84 between cooperating interface surfaces 86, 88 of barrel hub 60 and one or both yoke support arms 58.

By example and without limitation, elastomeric interface 84 is a resiliently compressible elastomeric joint stiffener 90 either free-floating between interface surfaces 86, 88 of barrel hub 60 and one or both yoke arm 58. For example, elastomeric joint stiffener 90 is formed of a rubber, neoprene or another elastomeric material having a high coefficient of friction. Alternatively, joint stiffener 90 is fixed on interface surfaces 86 of barrel hub 60. When pivot pin 52 is tightened, yoke support arms 58 are compressed inwardly (arrows 78) against hub 60 to squeeze elastomeric interface 84 along pivot axis 41, and the high coefficient of friction provided by elastomeric joint stiffeners 90 between cooperating interface surfaces 86, 88 operates to stiffen pivot joint 40 against inadvertent rotation about pivot axis 41. Loosening of pivot pin 52 relaxes yoke 50 and decompresses arms 58 outwardly (arrows 78) from barrel hub 60, which relaxes compression at elastomeric interface 84 and reduces pressure on elastomeric joint stiffeners 90, which in turn eases stiffness of pivot joint 40. Thus, rotational stiffness of pivot joint 40 is adjustable by tightening or loosening of pivot pin 52 for respectively increasing or decreasing pressure of cooperating interface surfaces 86, 88 on elastomeric joint stiffeners 90.

In one example of elastomeric interface 84, elastomeric joint stiffener 90 is an elastomeric material that is bonded, e.g., adhesively bonded, vulcanized or overmolded, directly to one or both interface surfaces 86 of hub 60. Alternatively, in another example of elastomeric interface 84, entire hub 60 of coupler interface 46, including both interface surfaces 86 thereof, is molded of hard yet resiliently compressible elastomeric material such as rubber, neoprene or other elastomeric material having a high coefficient of friction, whereby elastomeric joint stiffeners 90 are integrally formed at both interface surfaces 86 of hub 60. According to either embodiment, elastomeric joint stiffeners 90 at interface surfaces 86 of barrel hub 60 form elastomeric interface 84 with cooperating interface surfaces 88 of yoke support arms 58, whereby adjustment of stiffness of pivot joint 40 about pivot axis 41 is achieved by adjusting compression of resiliently compressible material of elastomeric joint stiffeners 90 between cooperating interface surfaces 86, 88 of barrel hub 60 and yoke support arms 58. Stiffness of pivot joint 40 for controlling angular arrangement of coupler component 34 about pivot axis 41 is thus adjustable by adjusting compression of elastomeric joint stiffeners 90.

In another example, elastomeric interface 84 is provided between cooperating interface surfaces 86, 88 of barrel hub 60 of coupler interface 46 and one or both support arms 58 of yoke 50 by providing resiliently compressible elastomeric joint stiffeners 92 on interface surface 88 of one or both yoke arm 58. For example, elastomeric joint stiffener 92 is formed of a rubber, neoprene or other elastomeric material having a high coefficient of friction. Accordingly, when pivot pin 52 is tightened, yoke arms 58 are compressed inwardly (arrows 78) against hub 60 to squeeze elastomeric interface 84 between barrel hub 60 and yoke arms 58, and the high coefficient of friction provided by elastomeric joint stiffeners 92 between cooperating interface surfaces 86, 88 operates to stiffen pivot joint 40 against inadvertent rotation. Loosening of pivot pin 52 relaxes yoke 50 and decompresses arms 58 outwardly (arrows 78) from barrel hub 60, which relaxes compression at elastomeric interface 84 and reduces pressure on elastomeric joint stiffeners 92, which in turn eases rotation of pivot joint 40. Thus, rotational stiffness of pivot joint 40 about pivot axis 41 is adjustable by tightening or loosening of pivot pin 52 for respectively increasing or decreasing pressure of cooperating interface surfaces 86, 88 on elastomeric joint stiffeners 92. For example, elastomeric interface 84 is provided by compression joint stiffeners 92 of one or both yoke arms 58 formed as an elastomeric material that is bonded, e.g., adhesively bonded, vulcanized or overmolded, directly to interface surfaces 88 of one or both yoke arms 58. Alternatively, one or both yoke arms 58 of pivot arm 42 is molded of a hard yet resiliently compressible elastomeric material having a high coefficient of friction, whereby elastomeric joint stiffeners 92 are integrally formed at interface surfaces 88 of both yoke arms 58 for forming elastomeric interface 84, whereby stiffness of pivot joint 40 about pivot axis 41 is adjustable. Elastomeric joint stiffeners 92 at interface surfaces 88 of yoke arms 58 form elastomeric interface 84 with cooperating interface surfaces 86 of barrel hub 60, whereby adjustment of stiffness of pivot joint 40 about pivot axis 41 is achieved by adjusting compression of resiliently compressible material of elastomeric joint stiffeners 92 between cooperating interface surfaces 86, 88 of barrel hub 60 and yoke arms 58. Stiffness of pivot joint 40 for controlling angular arrangement of coupler component 34 about pivot axis 41 is thus adjustable by adjusting compression of elastomeric joint stiffeners 92.

In another embodiment, elastomeric interface 84 is provided between hub 60 of coupler interface 46 and one or both arms 58 of yoke 50 by providing both elastomeric joint stiffeners 90 of barrel hub 60 of coupler interface 46, and elastomeric joint stiffeners 92 of one or both yoke arm 58 as a rubber, neoprene or other elastomeric material having a high coefficient of friction.

Figure 12:
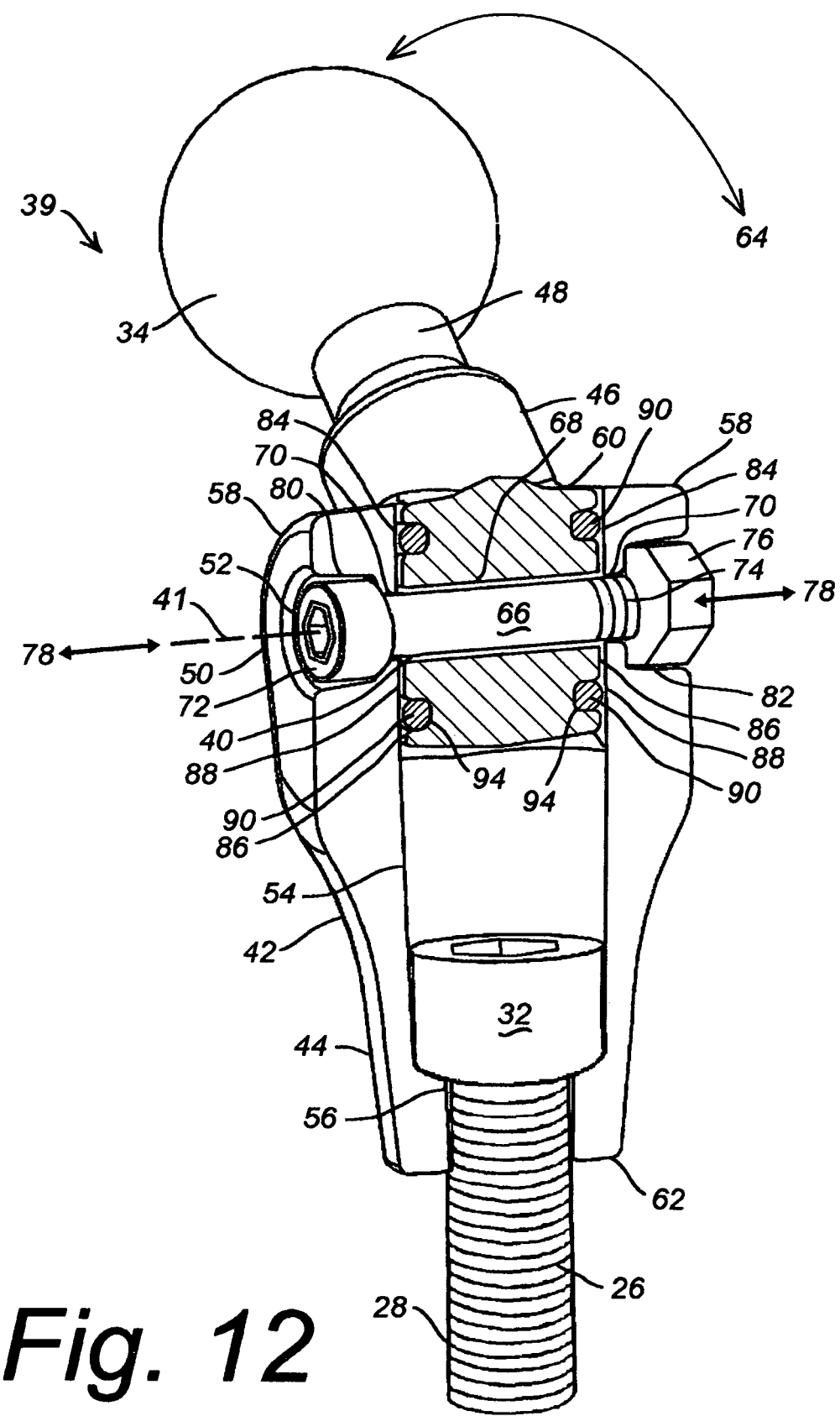
FIG. 12 illustrates another embodiment of the elastomeric interface of the pivot joint.

FIG. 12 illustrates another embodiment of elastomeric interface 84 between cooperating interface surfaces 86, 88 of barrel hub 60 of coupler interface 46 and one or both support arms 58 of yoke 50 for providing adjustable stiffness of pivot joint 40 about pivot axis 41. Here, either or both resilient joint stiffeners 90, 92 of elastomeric interface 84 are provided by resilient elastomeric gaskets or o-rings which, when formed of a rubber, neoprene or other elastomeric material, have a high coefficient of friction that permits secured pivot joint 40 to be adjusted (arrow 64) and maintain a new angular orientation more effectively than prior art devices. When resilient joint stiffeners 90, 92 are either resilient gaskets or o-rings, such gasket or o-ring joint stiffeners 90, 92 are either free-floating or seated in respective cooperating interface surfaces 86, 88 of barrel hub 60 and yoke arms 58. For example, o-ring joint stiffeners 90 are seated in grooves 94 formed in interface surfaces 86 of hub 60. Grooves 94 are sized such that o-ring joint stiffeners 90 protrude partially from interface surfaces 86 of barrel hub 60 into frictional contact with cooperating interface surfaces 88 of yoke arms 58. As in other embodiments disclosed herein, tightening of pivot pin 52 compresses yoke arms 58 inwardly (arrows 78) against hub 60 to squeeze protruding o-ring joint stiffeners 90 of elastomeric interface 84, and the high coefficient of friction provided by protruding o-ring joint stiffeners 90 between cooperating interface surfaces 86, 88 operates to stiffen pivot joint 40 against inadvertent rotation about pivot axis 41. Loosening of pivot pin 52 relaxes yoke 50 and decompresses arms 58 outwardly (arrows 78) from barrel hub 60, which relaxes compression at elastomeric interface 84 and reduces pressure on protruding o-ring joint stiffeners 90, which in turn eases rotation of pivot joint 40. Thus, rotational stiffness of pivot joint 40 is adjustable by tightening or loosening of pivot pin 52 for respectively increasing or decreasing pressure of cooperating interface surfaces 86, 88 on protruding elastomeric o-ring joint stiffeners 90.

Figure 13:
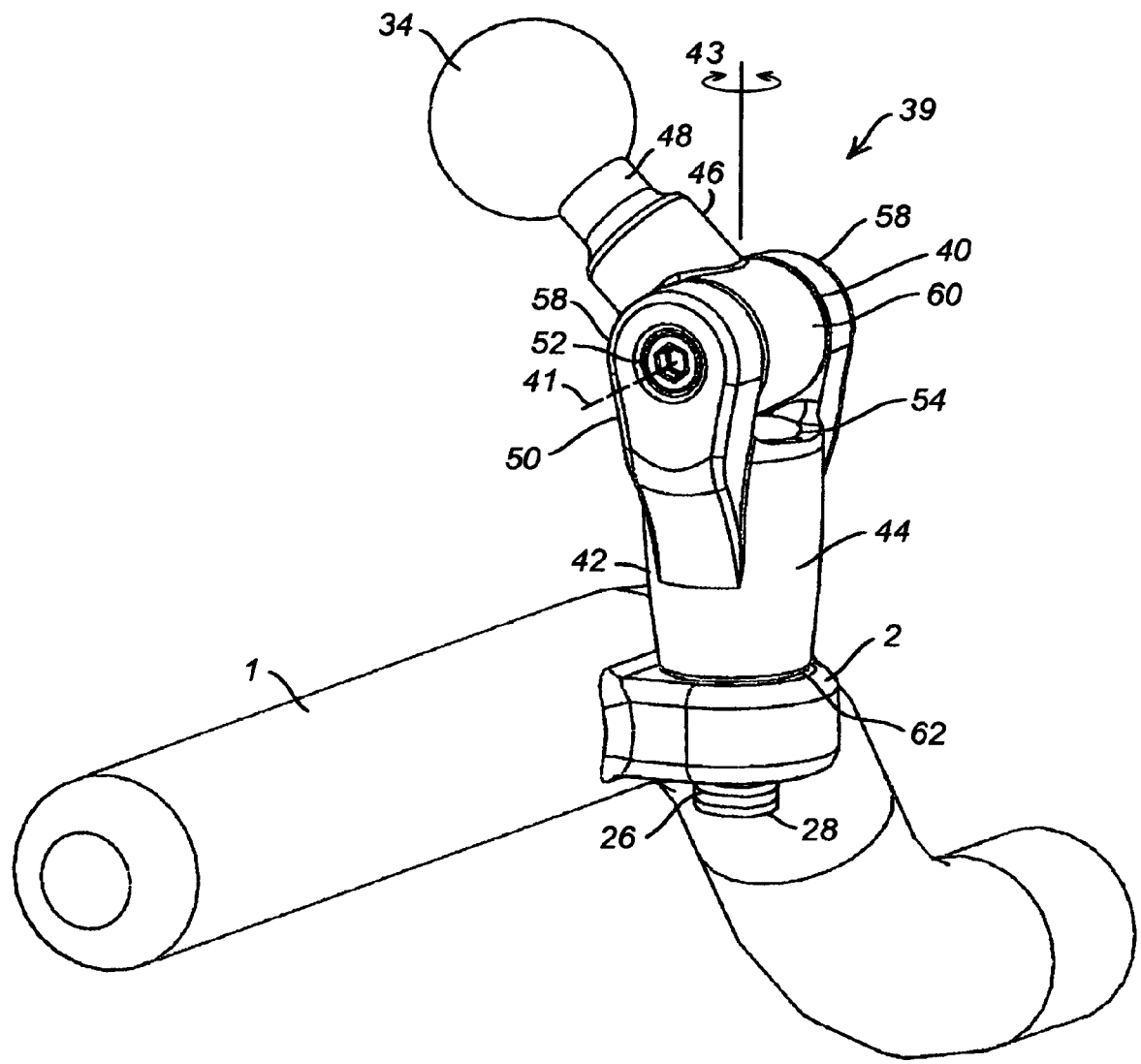
FIG. 13 illustrates a pivot arm mounted directly to the handlebar, with the novel mirror adapter mount eliminated from therebetween.

FIG. 13 illustrates connector 28 coupling pivot arm 42 of handlebar mounting device 39 directly to aperture 5 of mirror mount receiver eye 2, without bracket 12. For example, connector 28 is seated in counter-bore 54 beneath yoke 50 of pivot base 44 with shoulder 62 for engaging and nesting against mirror mount receiver 2. Threaded stem 26 is coupled into threaded aperture 5 for securing connector 28 to mirror mount receiver eye 2. Else, when aperture 5 of mirror mount receiver eye 2 is clearance hole for mounting stem 3 supporting rear view mirror 4, nut 30 engages threaded stem 26 for securing connector 28. Accordingly, pivot arm 42 mounts coupler component 34 directly to mirror mount receiver eye 2. Mounting device 39 may be rotatably adjusted (arrow 43) about connector 28 before securing to receiver eye 2.

Figure 14:
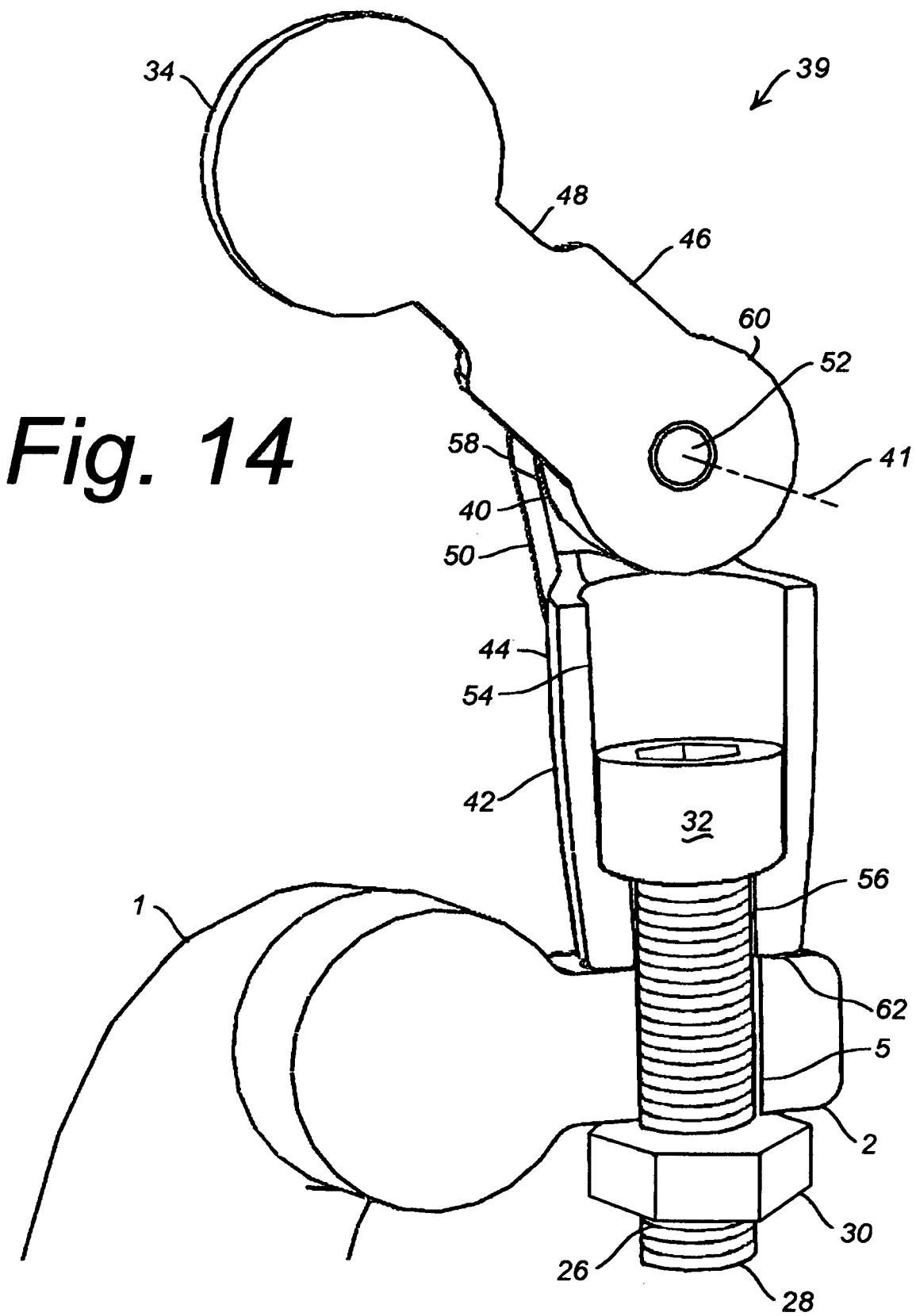
FIG. 14 illustrates a pivot arm mounted directly to the handlebar.

FIG. 14 is a cross-section of pivot arm 42 coupled directly to mirror mount receiver eye 2 by connector 28. Here, aperture 5 is a clearance for connector stem 26, and nut 30 secures connector 28 to mirror mount receiver eye 2 of handlebar 1.

Figure 15:
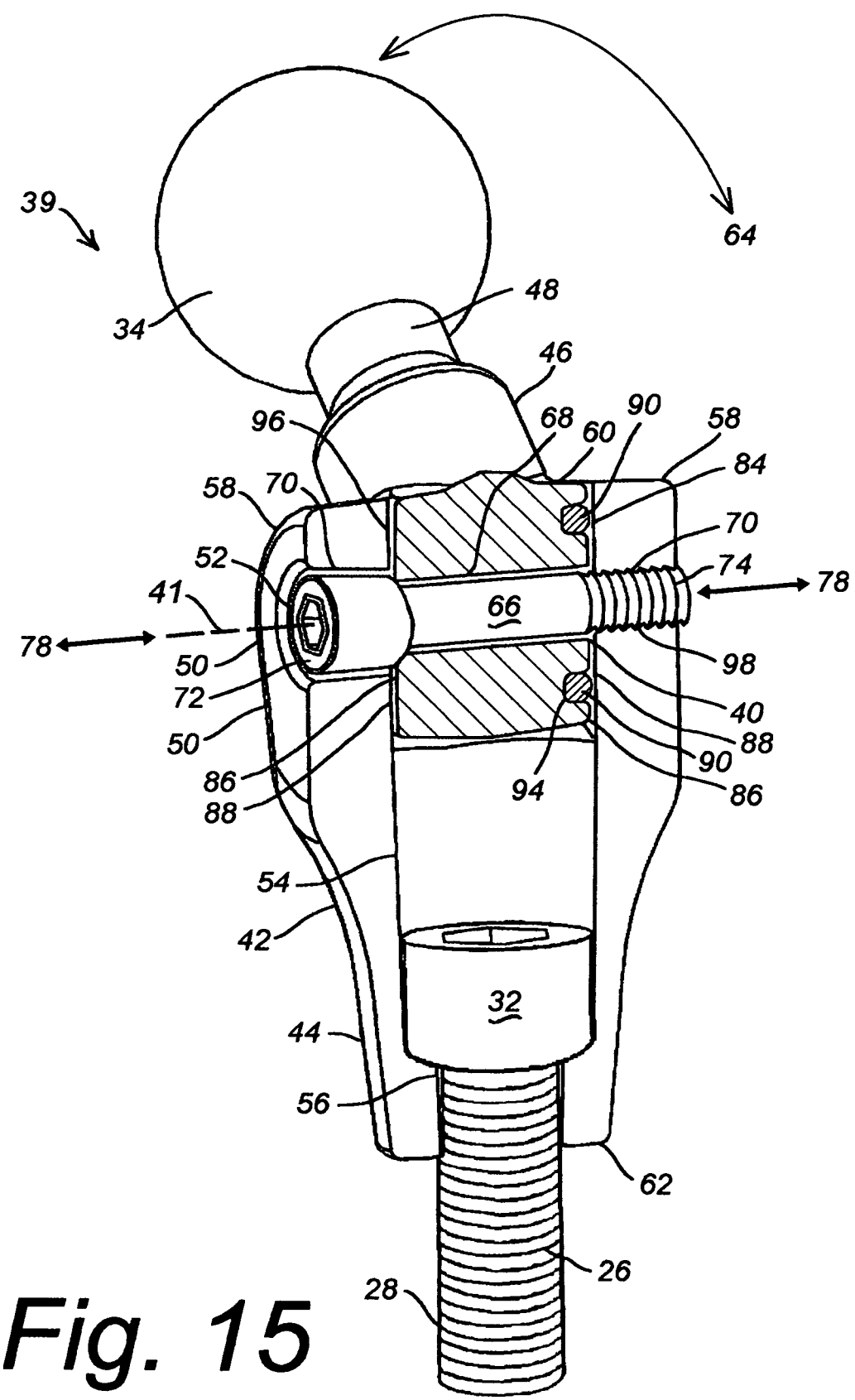
FIG. 15 illustrates another embodiment of the elastomeric interface of the pivot joint.

FIG. 15 illustrates resiliently compressible elastomeric interface 84 provided between interface surface 86 of barrel hub 60 of coupler interface 46 and cooperating interface surface 88 of only one support arm 58 of yoke 50 of pivot arm 42. Here, elastomeric interface 84 is provided by o-ring joint stiffener 90 seated in groove 94 formed in one interface surface 86 of hub 60 such that o-ring joint stiffener 90 protrudes partially from interface surface 86 into frictional contact with cooperating interface surface 88 of opposing yoke support arm 58. Apertures 70 in opposite support arm 58 of yoke 50 is enlarged to receive head 72 of pivot pin 52 completely therethrough. Accordingly, head 72 of pivot pin 52 rests against interface surface 86 of barrel hub 60 and spins in aperture 70 when coupler interface 46 is rotated. Pivot pin 52 compresses one interface surfaces 86 of barrel hub 60 against cooperating interface surface 88 of one yoke support arm 58 opposite from pivot pin head 72 for forming a single resiliently compressible elastomeric interface 84. Opposite from the single resiliently compressible elastomeric interface 84 a gap 96 is formed between the other interface surfaces 86 of barrel hub 60 and interface surface 88 of the other yoke support arm 58.

By example and without limitation, the single resiliently compressible elastomeric interface 84 is illustrated as o-ring joint stiffener 90 seated in groove 94. However, the single resiliently compressible elastomeric interface 84 is optionally provided according to any of the embodiments disclosed herein. Accordingly, such other embodiments of resiliently compressible elastomeric interface 84 are also contemplated and may be substituted without deviating from the scope and intent of the present invention.

Furthermore, aperture 70 in yoke support arm 58 is adapted to replace nut 76 for operation with threads 74 of pivot pin 52. For example, aperture 70 in yoke support arm 58 is threaded to match threads 74 at end of pivot shaft 66 opposite from head 72, thereby forming a threaded joint 98 between aperture 70 and threads 74 of pivot pin 52. Accordingly, turning of pivot pin 52 moves (arrows 78) shaft head 72 along pivot axis 41 for alternately tightening and loosening pivot joint 40, as disclosed herein.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A handlebar mounting device, comprising:
a pivot arm comprising a pivot base and a coupler interface with therebetween a pivot joint having an adjustable rotational stiffness, the pivot joint further comprising:
an arm and a hub relatively rotatably suspended therefrom,
an elastomeric interface substantially entirely positioned between opposing axial surfaces of the arm and the hub, and
a means for axially compressing the elastomeric interface against opposing axial surfaces of the arm and the hub;
a coupler component formed on the coupler interface; and
a connector adapted for securing the pivot base to a mirror mount receiver on a handlebar where a mirror mounting stem supporting a mirror normally resides.

2. The mounting device of claim 1, wherein the means for compressing the elastomeric interface between the arm and the hub further comprises a means for adjusting a spacing between the arm and the hub.

3. The mounting device of claim 1, wherein the pivot joint further comprises a pivot pin relatively rotatably suspending the hub from the arm; and
wherein the means for compressing the elastomeric interface between the arm and the hub further comprises means for shortening the spacing between the arm and the hub along the pivot pin.

4. The mounting device of claim 3, wherein the pivot joint further comprises a pair of the arms with the hub suspended therebetween on a pivot pin.

5. The mounting device of claim 4, wherein the means for compressing the elastomeric interface between the arm and the hub further comprises a means for compressing the spacing between the pair of arms.

6. The mounting device of claim 5, wherein the elastomeric interface between the arm and the hub further comprises an o-ring seated between the hub and one or both of the pair of arms.

7. The mounting device of claim 1, wherein the elastomeric interface between the arm and the hub further comprises an o-ring seated between the arm and the hub.

8. The mounting device of claim 7, wherein the pivot joint further comprises a pair of the arms; and
the pivot pin further comprises an at least partially threaded shaft passing through the hub and each of the arms, the shaft further comprising threads adjacent to one end thereof; and
the means for compressing the elastomeric interface between the arm and the hub further comprises a means for threadedly moving the shaft relative to one of the arms.

9. The mounting device of claim 8, further comprising a pair of the elastomeric interfaces each comprising an o-ring, and wherein one of the o-rings is seated between the hub and each of the arms.

10. A handlebar mounting device, comprising:
a pivot arm, comprising a connector base and a coupler interface with therebetween a pivot joint having an adjustable rotational stiffness, the pivot joint further comprising:
a support arm extended from one of the connector base and the coupler interface and having an aperture formed therethrough, a hub extended from a different one of the connector base and the coupler interface and having a bore therethrough, a pivot pin axially extended between the aperture through the support arm and the bore through the hub with at least one of the support arm and the hub being rotatable about the pivot pin, an elastomeric interface substantially entirely positioned between opposing axial surfaces of the support arm and the hub and axially compressible thereby, the elastomeric interface being seated in one of the opposing axial surfaces of the support arm and the hub, and a means for axially compressing the elastomeric interface between the opposing axial surfaces of the support arm and the hub;

a part-spherical coupler component formed on the coupler interface; and a connector adapted for securing the connector base to a mirror mount receiver on a handlebar where a mirror mounting stem supporting a minor normally resides.

11. The mounting device of claim 10, wherein the connector base further comprises a yoke comprising a pair of the support arms extended therefrom and each of the support arms further comprising an aperture formed therethrough;

wherein the hub further comprises a barrel hub formed on the coupler interface and sized to fit between the support arms of the yoke of the connector base with a ball component formed on a neck extended therefrom; and wherein the pivot joint further comprises the barrel hub seated within the yoke with the pivot pin rotatably connecting the barrel hub relative to the support arms of the yoke.

12. The mounting device of claim 11, wherein the pivot pin further comprises the means for compressing the elastomeric interface between the support arm and the hub, the pivot pin comprising a shaft engaged with one of the support arms of the yoke for adjustably compressing the compressible elastomeric interface between the barrel hub and at least one of the pair of support arms of the yoke.

13. The mounting device of claim 12, wherein at least one of the support arms of the yoke is further compressible inwardly about the barrel hub of the coupler interface.

14. The mounting device of claim 11, further comprising an elastomeric interface substantially entirely positioned between the opposing axial surfaces of each of the support arms of the yoke and the barrel hub of the coupler interface.

15. The mounting device of claim 12, wherein the connector base further comprises a counter-bore beneath the yoke, and an aperture substantially aligned with the counter-bore; and wherein the connector further comprises a fastener having a shaft sized to pass through the aperture.

16. The mounting device of claim 10, wherein the elastomeric interface compressible between the support arm and the hub further comprises an elastomeric o-ring.

17. The mounting device of claim 10, further comprising a substantially rigid bracket, comprising a first and second spaced-apart apertures each structured to receive a threaded minor mounting stem supporting a mirror;

wherein the connector further comprises a threaded shaft sized for being received through the first aperture of the bracket; and further comprising first securing means for securing the threaded shaft of the connector to the mirror mount receiver on a handlebar where a minor mounting stem supporting a mirror normally resides with a portion of the bracket secured therebetween.

18. A handlebar mounting device, comprising:

a pivot arm, comprising:

a connector base comprising a pair of support arms extended above the connector base and forming a yoke with a pair of clearance apertures mutually aligned between the pair of support arms, a coupler interface comprising a barrel hub positioned between the pair of support arms of the yoke with a central bore formed therethrough and having a part-spherical coupler component extended therefrom on a neck portion, a pivot pin extended axially through the clearance apertures of the pair of support arms of the yoke and extended axially through the central bore of the barrel hub therebetween, a resiliently compressible elastomeric interface substantially entirely positioned between cooperating axial interface surfaces of the barrel hub of the coupler interface and at least one of the support arms of the yoke axially aligned therewith, the elastomeric interface being seated in one of the cooperating axial interface surfaces, and a means for axially compressing the support arm of the yoke relative to the barrel hub with the elastomeric interface there between, whereby the elastomeric interface is compressible between the cooperating axial interface surfaces of the barrel hub of the coupler interface and the support arm of the yoke; and a connector adapted for securing the connector base to a minor mount receiver on a handlebar where a mirror mounting stem supporting a minor normally resides.

19. The mounting device of claim 18, further comprising one of the resiliently compressible elastomeric interfaces between opposing cooperating interface surfaces at opposite ends of the barrel hub of the coupler interface and each of the support arms of the yoke, and wherein the means for compressing the elastomeric interface between the cooperating interface surfaces of the barrel hub of the coupler interface and the support arm of the yoke further comprises a means for compressing the pair of support arms of the yoke inwardly of the barrel hub of the coupler interface.

20. The mounting device of claim 19, further comprising a substantially rigid bracket, comprising a first and second spaced-apart apertures each structured to receive a threaded shaft of a minor mounting stem supporting a mirror;

wherein the connector further comprises a threaded shaft sized for being received through the first aperture of the bracket; and first securing means for securing the threaded portion of the shaft of the connector to the minor mount receiver on a handlebar where a mirror mounting stem supporting a minor normally resides with a portion of the bracket secured therebetween.

* * * * *